(12) United States Patent
Gandal et al.

(10) Patent No.: US 8,009,673 B2
(45) Date of Patent: Aug. 30, 2011

(54) METHOD AND DEVICE FOR PROCESSING FRAMES (75) Inventors: Stefania Gandal, Hertzelia (IL); Amir Yosha, Reshon Letzion (IL); Yanina Zaslavsky, Zoran (IL)

(73) Assignee: Freescale Semiconductor, Inc., Austin, TX (US)

( * ) Notice: Subject to any disclaimer, the term of this patent is extended or adjusted under 35 U.S.C. 154(b) by 348 days.

(21) Appl. No.: 12/282,487

(22) PCT Filed: Mar. 13, 2006

(86) PCT No.: PCT/IB2006/050778
§ 371 (c)(1),
(2), (4) Date: Sep. 10, 2008

(87) PCT Pub. No.: WO2007/105035
PCT Pub. Date: Sep. 20, 2007

(65) Prior Publication Data
US 2009/0097501 A1    Apr. 16, 2009

(51) Int. Cl.
*H04L 12/28* (2006.01)
*H04J 3/24* (2006.01)
(52) U.S. Cl. .................. 370/392; 370/474
(58) Field of Classification Search .......... 370/392, 370/469, 474, 476
See application file for complete search history.

(56) References Cited

U.S. PATENT DOCUMENTS

| 6,356,951 | B1 | 3/2002 | Gentry, Jr. | |
|---|---|---|---|---|
| 6,788,683 | B1 | 9/2004 | Ikeda et al. | |
| 6,789,116 | B1 | 9/2004 | Sarkissian et al. | |
| 6,954,789 | B2 | 10/2005 | Dietz et al. | |
| 2004/0039832 | A1* | 2/2004 | Hidaka et al. | 709/230 |
| 2004/0078480 | A1 | 4/2004 | Boucher et al. | |
| 2004/0083299 | A1 | 4/2004 | Dietz et al. | |
| 2004/0190512 | A1* | 9/2004 | Schultz | 370/389 |
| 2005/0125424 | A1* | 6/2005 | Herriott et al. | 707/100 |
| 2005/0226144 | A1* | 10/2005 | Okita | 370/219 |
| 2007/0115982 | A1* | 5/2007 | Pope et al. | 370/392 |
| 2007/0208876 | A1* | 9/2007 | Davis | 709/240 |
| 2008/0198853 | A1* | 8/2008 | Irish et al. | 370/392 |
| 2009/0207857 | A1* | 8/2009 | Alexander, Jr. | 370/474 |

FOREIGN PATENT DOCUMENTS

EP    1159814 B1    5/2005

* cited by examiner

*Primary Examiner* — Andrew Lee (57) ABSTRACT

A device and a method for processing a frame, the method includes: receiving a frame; retrieving a lookup key parse command that includes an instruction field and an bitmap representative of selected frame fields to be searched in the frame; generating a lookup key by extracting at least one frame field if the type of the received frame matches an expected frame type; and looking up, using the lookup key, for additional frame processing instructions.

20 Claims, 6 Drawing Sheets

METHOD AND DEVICE FOR PROCESSING FRAMES

FIELD OF THE INVENTION

The invention relates to a method and devices for processing frames.

BACKGROUND OF THE INVENTION

In today's communications, digital networks transport large amounts of information. Network services can be, for example, traditional voice phone, facsimile, television, audio and video broadcast, and data transfer.

Communication controllers are required to handle frames that are compliant with various communication protocols. Each protocol of the protocol suite is usually detectable by dedicated fields that are usually part of the frame header. The following headers illustrated some commonly used headers: (i) UDP or TCP or SCTP header followed by an IP header and an Ethernet header, (ii) UDP or TCP or SCTP header followed by an IP header, PPP header, PPPoE header and an Ethernet header, (iii) AAL2 header followed by an ATM header, (iv) UDP or TCP or SCTP header followed by an IP header, Ethernet header, RFC2684b header, AAL5 header and ATM header, (v) UDP or TCP or SCTP header followed by an IP header, RFC2684r header, AAL5 header and ATM header, (vi) UDP or TCP or SCTP header followed by an IP header, PPP header, PPPoE header, Ethernet header, RFC2684b header, AAL5 header and ATM header, (vii) UDP or TCP or SCTP header followed by an IP header, PPP header, RFC2684-LLC header, AAL5 header and ATM header.

Interworking includes receiving a frame of a first type and converting it to a frame of another type. Typical interworking includes converting Ethernet frames to AAL5 frames or AAL2 frames, and the like. Interworking is usually used in order to bridge between network that use different protocol suits.

A typical frame processing sequence starts by receiving the frame, parsing its header to determine the type of the frame (which communication protocol), and performing various processing stages in response to the type of the frame.

The following patents and patent applications illustrate various methods and devices for parsing frames: U.S. Pat. No. 6,954,789 and U.S. patent application publication serial number 2004/0083299 of Deitz et al., U.S. patent application publication serial number 2004/0078480 of Boucher et al, and U.S. Pat. No. 6,356,951 of Gentry.

There is a need to provide an efficient method and device for processing frames.

SUMMARY OF THE PRESENT INVENTION

A method and a device for processing frames, as described in the accompanying claims.

BRIEF DESCRIPTION OF THE DRAWINGS

The present invention will be understood and appreciated more fully from the following detailed description of embodiments thereof taken in conjunction with the accompanying drawings in which.

DETAILED DESCRIPTION OF THE DRAWINGS

Embodiments of the present invention illustrated in the accompanying drawings provide a method for processing a frame. The method includes: (i) receiving a frame, (ii) retrieving a lookup key parse command that includes a instruction field and an bitmap representative of selected frame fields to be searched in the frame, (iii) generating a lookup key by extracting at least one frame field if the type of the received frame matches an expected frame type; and (iv) looking up, using the lookup key, for additional frame processing instructions.

Embodiments of the present invention illustrated in the accompanying drawings provide a device for processing a frame. The device includes: a receive interface adapted to receive a frame and a processor that is adapted to retrieve a lookup key parse command that comprises an instruction field and an bitmap representative of selected frame fields to be searched in the frame; generate a lookup key by extracting at least one frame field if the type of the received frame matches an expected frame type; and perform a look up, using the lookup key, for additional frame processing instructions.

The device and method make use of parse commands the include bitmap representing fields to be searched. By altering the bits of the bitmaps different fields can be extracted and used as lookup keys. Various types of parse commands facilitate the execution of a large variety of operations. By linking parse commands to each other as well as providing default parse commands multiple field extraction and lookup key generation are provided.

Conveniently, the type of a received frame is verified. During a first verification sequence the different fields of the frame can be extracted and offset information representative of the frame type is also stored. Accordingly additional parsing operations can use this stored offsets, thus providing an efficient multiple iteration parsing process.

Figure 1:
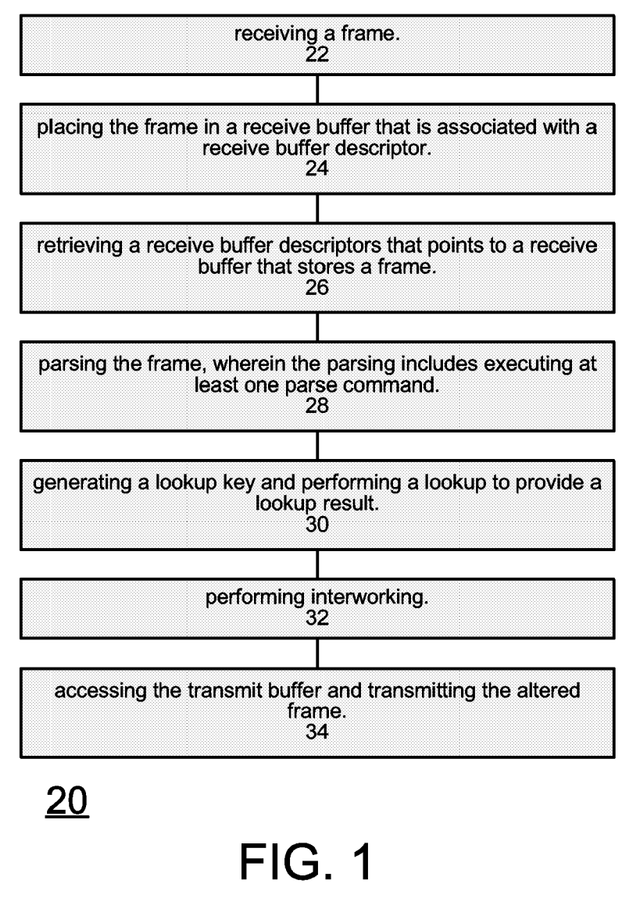
FIG. 1 illustrates a reception sequence according to an embodiment of the invention.

FIG. 1 illustrates a reception sequence 20 according to an embodiment of the invention.

Reception sequence 20 starts by stage 22 of receiving a frame. The frame can be received from various ports of a communication integrated circuit. Typically, lower layer processing such as physical layer processing and even MAC layer processing are applied in order to construct the frame. In many cases a frame is sent to the communication integrated circuit in many packets. The physical layer and MAC layer processing reconstruct the frame. The frame can be received by a receive interface that can include some physical layer components, MAC layer components and the like.

Stage 22 is followed by stage 24 of placing the frame in a receive buffer that is associated with a receive buffer descriptor.

Methods and devices for using buffer descriptors are known in the art. These prior art method can be used for managing the buffers and the buffer descriptors. Various examples of data transmission devices and methods using buffer descriptors are illustrated in the following U.S. patents and patent applications, all being incorporated herein by reference: U.S. Pat. No. 6,212,593 of Pham et al., U.S. Pat. No. 6,735,210 of Lindeborg et al., U.S. Pat. No. 6,154,460 of Kerns et al., U.S. Pat. No. 6,298,396 of Loyer et al., U.S. patent application 2004/0073724 of Wilson et al., U.S. patent application 2002/0176430 of Sangha et al., U.S. patent application 2005/0243816 of Wrenn et al., U.S. patent application 2005/0093885 of Savekar et al., U.S. patent application 2005/0068956 of Liao et al., and U.S. patent application 2002/0161943 of Kim.

Stage 24 is followed by stage 26 of retrieving a receive buffer descriptors that points to a receive buffer that stores a frame. This can be done by a processor that can select a receive buffer descriptor out of many receive buffer descriptors in various manners. Typically the receive buffer descriptors are arranged in strings and the processor just scans the receive buffer descriptor strings.

Stage 26 is followed by stage 28 of parsing the frame, wherein the parsing includes executing at least one parse command. The parse commands are conveniently arranged in data structures wherein each data structure includes a string (or chain) of parse commands.

Each parse command string starts by a first parse command and ends by last parse command. Conveniently, each parse command includes a link to the next parse command or a link to a lookup table. A typical parsing stage may include executing a parse command, determining that the received frame does not correspond to a certain frame type and continuing to the next parse command.

According to an embodiment of the invention a parse command includes an instruction field and a bitmap representative of selected frame fields to be searched in the frame. An execution of a parse command includes retrieving the parse command, determining which set of operations to execute, in response to the parse command, and executing the set of instructions. By using parse command that includes the bitmap the programming of the parsing process is greatly simplified. A user can just determine which bit to set and the device automatically searched for these fields.

According to another embodiment of the invention default parse command are provided. Usually each type of frame (each protocol suite) has its own default parse command. This default parse command searches for predefined fields in the frame. The default parse commands can be inserted in the parse command strings but this is not necessarily so.

Stage 28 is followed by stage 30 of generating a lookup key and performing a lookup to provide a lookup result. The lookup result can be a link to an interworking instruction, a link to another parse command and the like.

Stage 30 is followed by stage 32 of performing interworking. This stage can include altering the frame and placing the altered frame in a transmit buffer that is associated with a transmit buffer descriptor.

Stage 32 is followed by stage 34 of accessing the transmit buffer and transmitting the altered frame.

Figure 2:
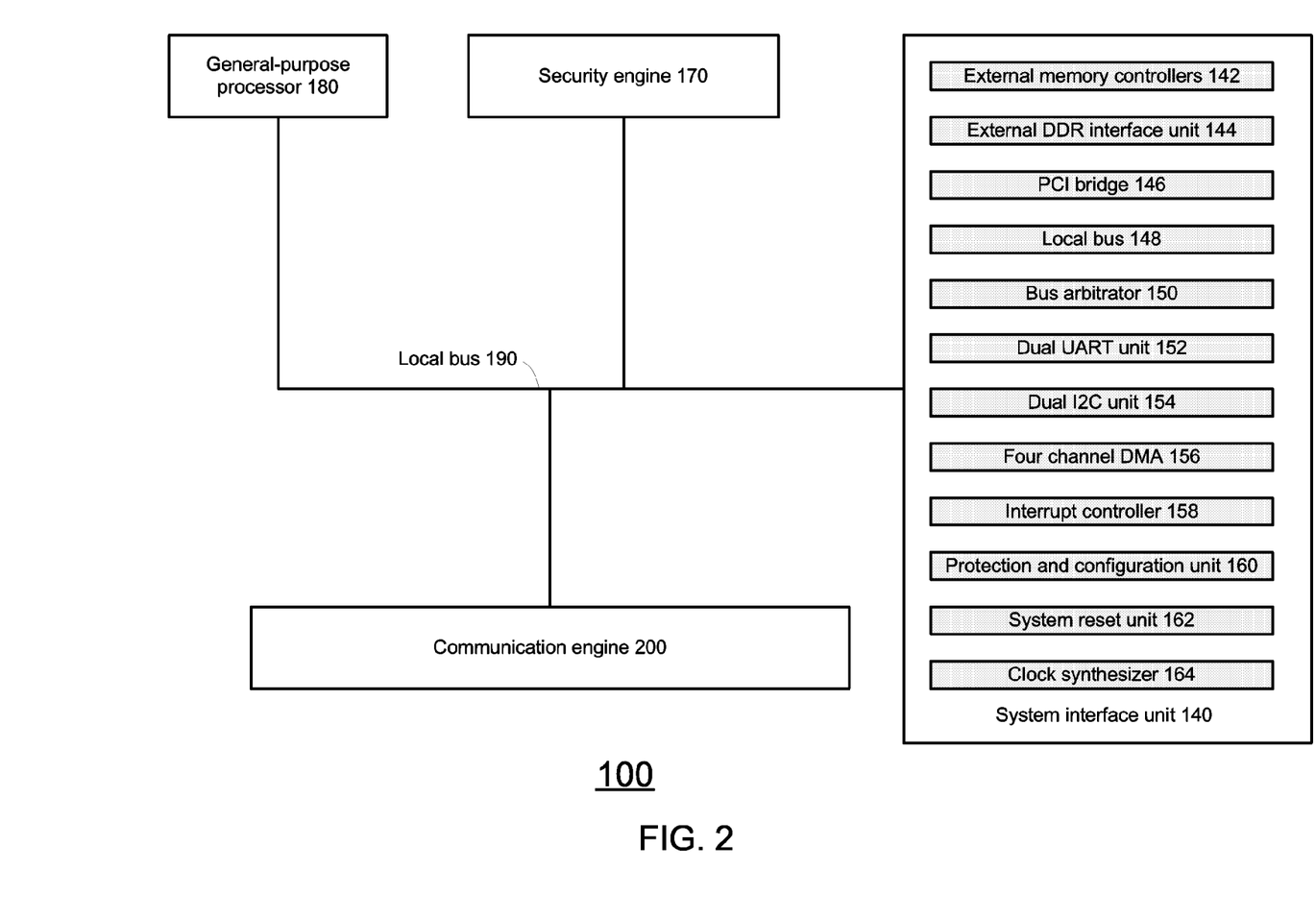
FIG. 2 illustrates a communication device according to an embodiment of the invention.

FIG. 2 illustrates a communication device 100, according to an embodiment of the invention.

Communication device 100 includes multiple processors. It is noted that single processor communication integrated circuits can be used.

Communication device 100 includes a first processor, such as general-purpose processor 180, a security engine 170, system interface unit 140, communication engine 200 and multiple ports (not shown). Components 180, 170, 140 and 200 are connected to each other by central bus 190.

The general-purpose processor 180 can include multiple execution units such as but not limited to an integer unit, a branch processing unit, a floating point unit, a load/store unit and a system register unit. It can also include various cache memories, dynamic power management unit, translation look aside buffers, and the like.

The general-purpose processor 180 controls the communication device 100 and can execute various programs according to the required functionality of communication device 100. The general-purpose processor 180 can be a member of the PowerPC™ family but this is not necessarily so.

The security engine 170 can apply various security mechanisms including encryption based mechanisms and the like.

Communication device 100 can be connected to multiple memory units as well as other components. These components are interfaced by system interface unit 140. System interface unit 140 may include some of the following components: external memory controllers 142, external DDR interface unit 144, PCI bridge 146, local bus 148, bus arbitrator 150, Dual UART unit 152, dual 12C unit 154, a four channel DMA 156, interrupt controller 158, protection and configuration unit 160, system reset unit 162 and clock synthesizer 164. It is noted that other interfacing components can be used.

Conveniently, the communication engine 200 is adapted to receive frames, parse frames perform lookups. The lookup tables are conveniently stored in memory units outside the communication engine 200, such as but not limited to an external memory 212 of FIG. 3. Parse commands can be stored within communication engine 200.

Figure 3:
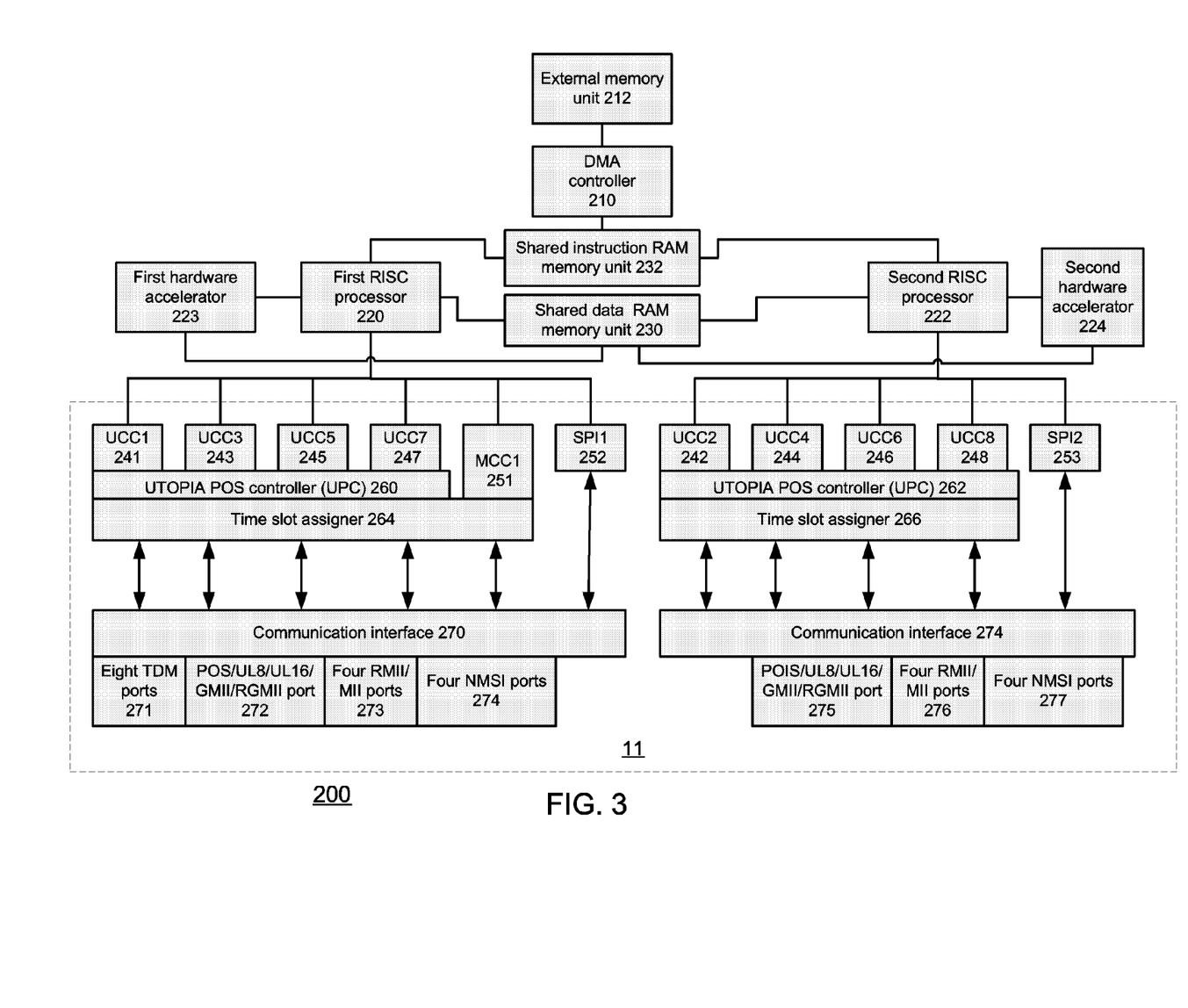
FIG. 3 illustrates a communication engine according to an embodiment of the invention.

FIG. 3 illustrates a communication engine 200, according to an embodiment of the invention.

It is noted that FIG. 3 illustrates an embodiment of the invention and that other communication engines (including those who have a single processor or more that two processors) can be used. It is further noted that some of the commands can be executed by the general purpose processor 180.

The communication engine 200 is a versatile communication component that can manage multiple communication ports that operate according to different communication protocols. It includes two RISC processors 220 and 222 that can work substantially independently from each other.

The communication engine 200 includes two RISC processors 220 and 222, DMA controller 210, a shared data RAM memory unit 230, a shared instruction RAM memory unit 232, eight universal communication controllers denoted UCC1-UCC8 241-248, one multi-channel communication controller (MCC) 251, two serial peripheral interfaces denoted SP1-SP2 252-253, two UTOPIA POS controllers 260 and 262, two time slot assigners 264 and 266 and two communication interfaces 270 and 274. Time slot assigner 264 assigns time slots for accessing communication interface 270. Time slot assigner 266 assigns time slots for accessing communication interface 274.

It is noted that the mentioned above communication controllers, interfaces and assigners can be viewed as a receive interface 11 of the communication engine 200. It is noted that these communication controllers as well as the interface can be regarded as belonging to a transmit interface. The receive interface can include a single communication interface, or multiple communication interfaces.

Each of the serial peripheral interfaces is adapted to manage transmissions and receptions of data, status information and control information between the communication engine 200 and other components (such as PHY components) using serial communication protocols.

The first communication interface 270 is connected to multiple time division multiplex (TDM) ports that are collectively denoted 271, a UTOPIA-packet over SONET (POS) port 272, as well as four RMII ports collectively denoted 273, and four NMSI ports collectively denoted 274.

The second communication interface 274 is connected to another UTOPIA-packet over SONET (POS) port 275, four RMII ports collectively denoted 276, and four NMSI ports collectively denoted 277. It is noted that other communication protocols can be supported by communication device 100.

Each RISC processor out of 220 and 222 can access the shared data RAM memory unit 230 and the shared instruction RAM memory unit 232. RISC processor 220 can control half of the multiple communication controllers and ports. For example, RISC processor 220 can control UCC1-UCC4 241-244, MCC 251 and SPI1 252. It can also communicate with UTPOIA POS controller 260 and time slot assigner 264.

The shared data RAM memory unit 230 can store portions of lookup tables, parse command tables, receive buffer descriptors, transmit buffer descriptors, and the like.

Conveniently, a UCC can support the following communication protocols and interfaces (not all simultaneously): 10/100 Mbps Ethernet, 1000 Mpbs Ethernet, IPv4 and IPv6, L2 Ethernet switching using, ATM protocol via UTOPIA interface, various types of HDLC, UART, and BISYNC.

Conveniently, MCC 251 supports two hundred and fifty six HDLC or transparent channels, one hundred and twenty eight SS#7 channels or multiple channels that can be multiplexed to one or more TDM interfaces.

In addition, the communication engine 200 can include a controller (not shown) as well as an interrupt unit that coordinates the various components of the communication engine, as well as to enable the communication engine 200 to communicate with general-purpose processor 180, security engine 170 and system interface unit 140.

The first RISC processor 220 is connected to a first hardware accelerator 223. The first hardware accelerator 223 can access the shared data RAM memory unit 230. The second RISC processor 222 is connected to a second hardware accelerator 224.

The DMA controller 210 is connected to an external memory unit 212.

Figure 4:
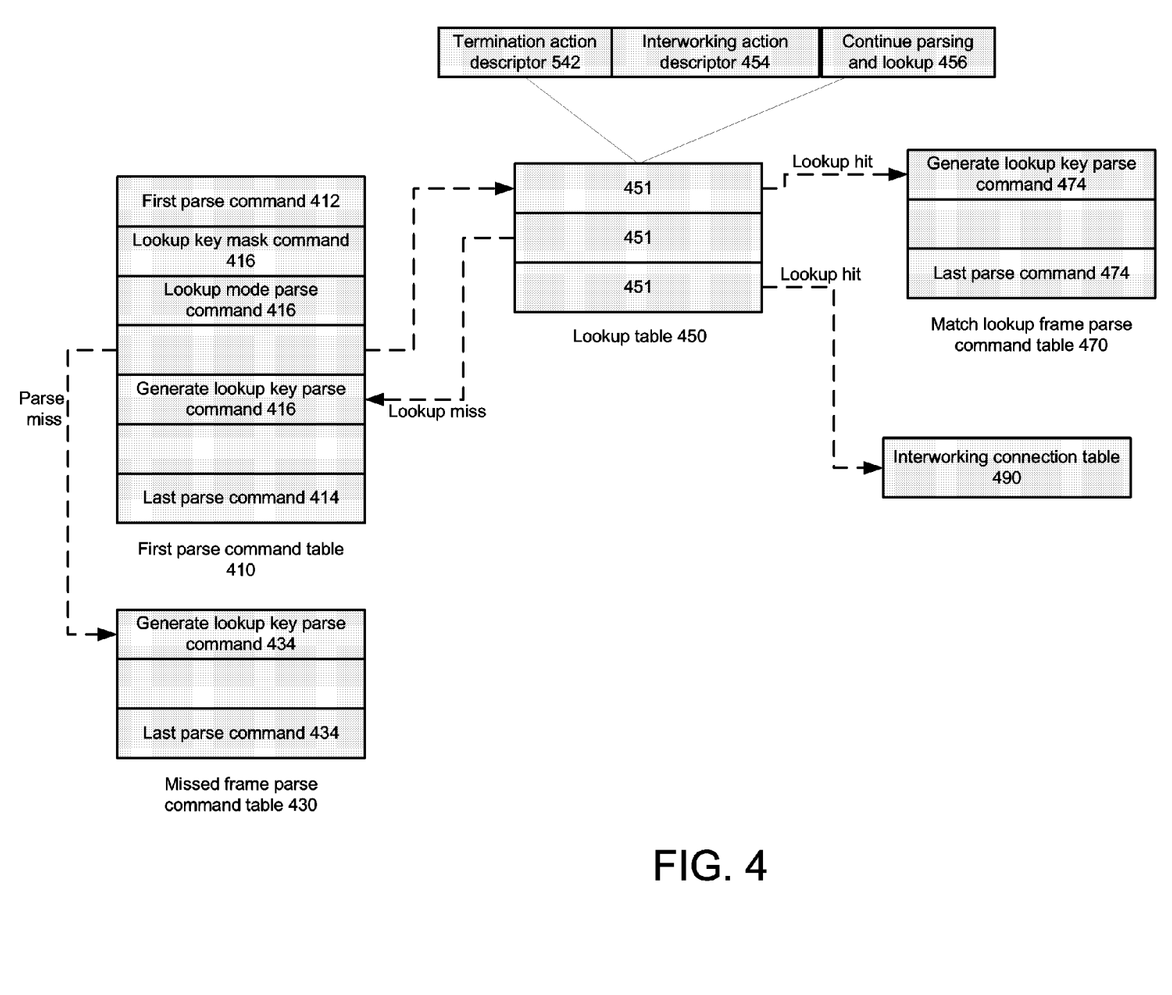
FIG. 4 illustrates a data structure group according to an embodiment of the invention.

FIG. 4 illustrates a data structure group 400, according to an embodiment of the invention.

It is noted that data structures 410-490 (collectively referred to as data structure group 400) are used to process certain types or sub-types of frames. Other types (or sub-types) of frames can be processed by other groups of data structures. It is noted that the selection can be responsive to a match (or mismatch) between certain fields of the frame and predefined fields.

It is noted that some data structure groups can share one or more data structure, but this is not necessarily so.

The inventors used a different data structure group for each Ethernet receive port, for each VC value of ATM receive port, or for each combination of VC/CID values of ATM receive port and the like.

First parse command table 410 includes multiple parse commands. The parse commands can differ from each other. The first parse command table 410 starts by a first parse command 412, last parse command 414 and optionally additional parse commands that are collectively denoted 416. The first parse command is usually a generate lookup key parse command. Each parse command is linked to one or more parse commands within first parse command table 410. Most parse commands of table 410 include a link to a missed frame parse command, whereas that link is used when a parse miss occurs. Most parse commands of table 410 include a link to a lookup table entry, to enable a lookup stage if a matching frame is found.

Missed frame parse command table 430 includes multiple parse commands (collectively denoted 434) as well as a last parse command 434. These parse commands can differ from each other.

Match lookup parse command table 470 includes multiple parse commands (collectively denoted 474) as well as a last parse command 474. These parse commands are executed if a lookup match is found but additional parsing is required. These parse commands can differ from each other.

Lookup table 450 includes multiple entries 451, multiple entries 451 include termination action descriptors 452, multiple interworking action descriptors 454, as well as continue parsing flags 456. At least one entry of the lookup table 450 is linked to a parse command within the first parse command table 410. At least one entry of the lookup table 450 is linked to an entry of the interworking connection table 490. At least one entry of the lookup table 450 is linked to a parse command of the match lookup parse command table 470.

Figure 6:
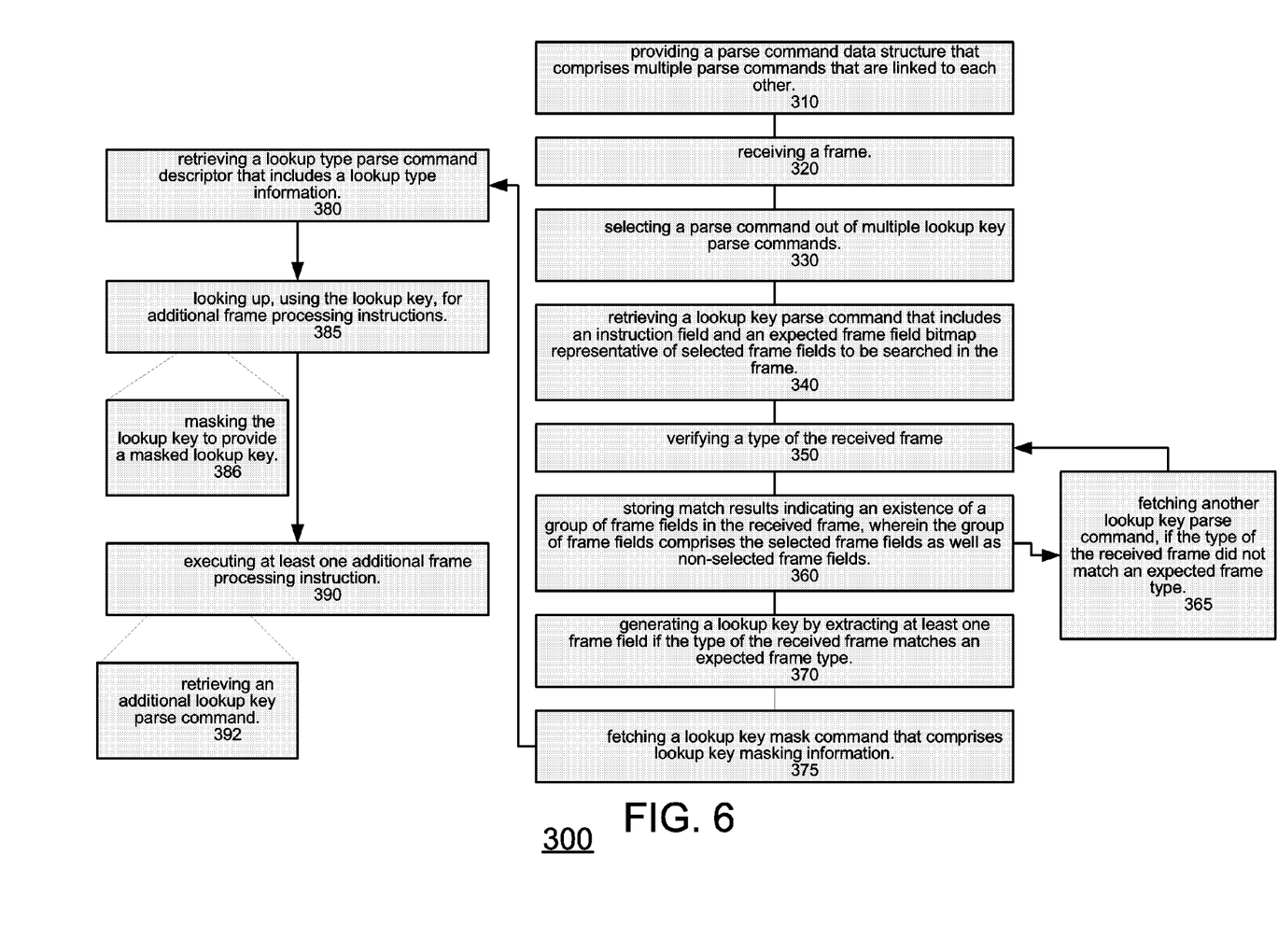
FIG. 6 illustrates method for processing a frame.

The links between the parse commands and the entries are further illustrated in FIG. 6 which is a flow chart illustrating a method 300 for processing a frame, according to an embodiment of the invention.

Figure 5:
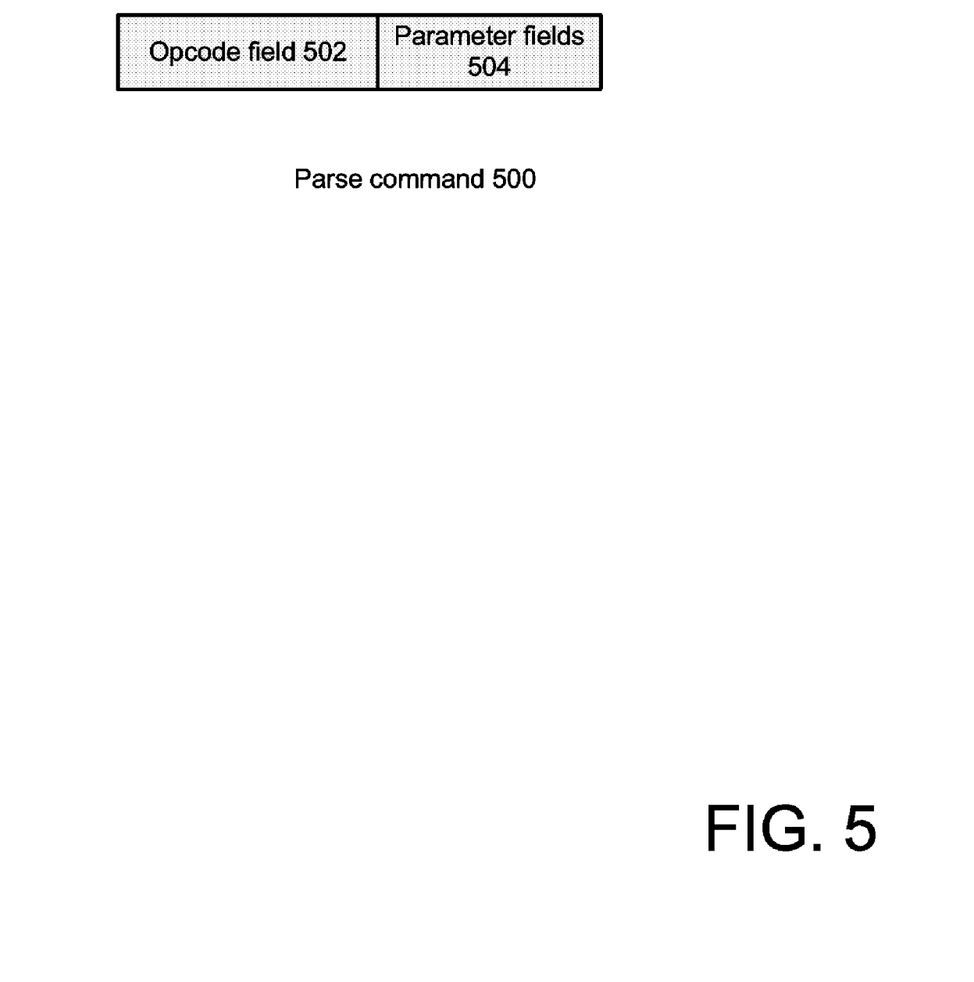
FIG. 5 illustrates a parse command according to an embodiment of the invention.

FIG. 5 illustrates a parse command 500 according to an embodiment of the invention.

There are various types of parse commands. They have a similar structure. This structure is illustrated in FIG. 5, while the various types of parse commands are illustrated in table 1.

Parse command 500 includes an opcode field (also referred to as instruction field) 502 and parameter fields 504. Table 1 illustrates the relationship between the different opcodes, their opcode field values and the type of parse command.

TABLE 1

| Opcode name/type of parse command | Opcode field value | comments |
|---|---|---|
| Lookup key parse command Ethernet | 0x1 | Generate a lookup key from Ethernet frame. |
| Lookup key parse command Ethernet fast mode | 0x2 | Generate a lookup key from Ethernet layer 2 (L2) frame header |
| Loockup key parse command AAL5LLC fast mode | 0x8 | Generate a lookup key from ATM AAL5 RFC2684 bridged LLC encapsulated frames |
| Lookup key parse command AAL5VCM fast mode | 0x9 | Generate a lookup key from ATM AAL5 RFC2684 bridged VC encapsulated frames |
| Lookup key parse command AAL5LLC | 0xA | Generate a lookup key from ATM-RFC2684/2364 LLC encapsulated frames |
| Lookup key parse command AAL5VCM fast mode | 0xB | Generate a lookup key from ATM AAL5 RFC2684 bridged LLC encapsulated frames |
| Lookup key parse command AAL2 | 0xC | Generate a lookup key from ATM AAL2 frames |
| Lookup key mask command | 0x10 | Mask portions of the lookup key |
| Lookup key store command | 0x11 | Store the current lookup key |
| Lookup key restore command | 0x12 | Restore a previously stored lookup key |
| General lookup key parse command | 0x16, 0x17 | Extract fields of size of N form offset M from the beginning of a frame or from L2, L3 or L4 headers. |
| Four way hash lookup mode parse command | 0x22 | Lookup in a four way hash lookup mode |

TABLE 1-continued

| Opcode name/type of parse command | Opcode field value | comments |
|---|---|---|
| Eight way hash lookup mode parse command | 0x23 | Lookup in a eight way hash lookup mode |
| CAM emulation mode lookup type parse command | 0x28 | Lookup in CAM emulation mode |
| Indexed mode lookup type parse command | 0x29 | Lookup in indexed mode |
| Last parse command | 0x3F | Last parse command. |

The following tables illustrate the opcode field as well as parameter fields of few parse commands. The parameter fields include various parameters as well as a bitmap representative of selected frame fields to be searched in the frame. The fields that are included in the bitmap are marked with a "*" symbol.

Table 2 and table 3 illustrate a lookup key parse command for Ethernet frames and of a fast mode (only layer 2 extraction) lookup key parse command for Ethernet frames. The fast mode assumes that part of the lookup key is known and only layer 2 (L2) extraction is required.

Table 2 illustrates the content of a lookup key parse command Ethernet.

TABLE 2

| Length (bits) | Field name | Description |
|---|---|---|
| 8 | Opcode | 0x01 |
| 8 | PCDID value | Parse command identification number. |
| 1 | UIE | Generate interrupt (do not generate) if unrecognized frame |
| 1 | MISS_PC_PTR | Pointer to a missed frame parse command |
| 6 | TCIn | TCI header number n in the frame |
| 1 | PPPoE | Expect/do not expect PPPoE header in frame |
| 1 | IP | Expect/do not expect IP header in frame |
| 1 | TCP | Expect/do not expect TCP header in frame |
| 1 | UDP | Expect/do not expect UDP header in frame |
| 1 | SCTP | Expect/do not expect SCTP header in frame |
| 1 | MACdst* | Extract/disable extraction of MAC destination address field for lookup key |
| 1 | MACsrc* | Extract/disable extraction of MAC source address field for lookup key |
| 1 | TCI1* | Extract/disable extraction of TCI1 field for lookup key |
| 1 | TCI2* | Extract/disable extraction of TCI2 field for lookup key |
| 1 | Etype* | Extract/disable extraction of Ethernet type field for lookup key |
| 1 | PPPSID* | Extract/disable extraction of PPPoE field for lookup key |
| 1 | PPPPID* | Extract/disable extraction of PPP protocol identifier field for lookup key |
| 1 | IPsrc* | Extract/disable extraction of IP source address field for lookup key |
| 1 | Ipdst* | Extract/disable extraction of IP destination address field for lookup key |
| 1 | PTYPE* | Extract/disable extraction of IP protocol type field for lookup key |
| 1 | IPTOS* | Extract/disable extraction of IP TOS field for lookup key |
| 1 | TUSPsrc* | Extract/disable extraction of TCP/UDP/SCTP source port field for lookup key |
| 1 | TUSdst* | Extract/disable extraction of TCP/UDP/SCTP destination port field for lookup key |
| 1 | TFLG* | Extract/disable extraction of $14^{th}$ byte of TCP header that includes TCP flags |
| 1 | SrcPort* | Add/do not add a serial number of the source port in the lookup key. This can be used to identify the source port (UCC) of the frame. |
| 1 | PCDID* | Add/do not add the PCDID value to the lookup key |

Table 3 illustrates the content of a lookup key parse command Ethernet fast mode.

TABLE 3

| Length (bits) | Field name | Description |
|---|---|---|
| 8 | Opcode | 0x02 |
| 8 | PCDID value | Parse command identification number. |
| 1 | MACdst* | Extract/disable extraction of MAC destination address field for lookup key |
| 1 | MACsrc* | Extract/disable extraction of MAC source address field for lookup key |
| 1 | TCI1* | Extract/disable extraction of TCI1 field for lookup key |
| 1 | TCI2* | Extract/disable extraction of TCI2 field for lookup key |
| 1 | SrcPort* | Add/do not add a serial number of the source port in the lookup key. This can be used to identify the source port (UCC) of the frame. |
| 1 | PCDID* | Add/do not add the PCDID value to the lookup key |

Those of skill in the art will appreciate that different protocols require different extraction fields. Especially, the bitmap representative of selected frame fields to be searched in the frame is different. In addition fields that indicate which fields to expect or how a certain frame was encapsulated can differ from protocol to protocol.

For example, a lookup key parse command AAL5 LLC will includes RFC 2684 field, RFC 2684R, RFC 2364, RFC 2364 non compressed PID and RFC 2364 compressed PID fields that indicate how that frame was encapsulated.

Table 4 illustrates the content of a lookup key parse command AAL2. This parse command slightly differs from the lookup key parse commands used for Ethernet, ATM. ATMAAL5, as the lookup key is generated by concatenating a lookup key portion that is programmed by the user and some bytes of the payload of the frame.

TABLE 4

| Length (bits) | Field name | Description |
|---|---|---|
| 8 | Opcode | 0x0C |
| 8 | PCDID value | Parse command identification number. |
| 1 | PKey* | Add/do not add bytes from frame payload to the lookup key portion |
| 1 | AAL2Key* | Add/do not add lookup key portion programmed by user |
| 1 | PCDID* | Add/do not add the PCDID value to the lookup key |
| 8 | Offset_payload | Offset from frame start to the bytes in the payload to be added to the lookup key |
| 8 | Payload_byte_size | Number of payload bytes to be added to the lookup key |

Table 5 illustrates a general lookup key parse command. This general lookup key parse command defines multiple (J+1) byte groups having programmable offsets from various predefined start points of the frame. J is a positive integer that can exceed three.

A typical start point is a start of a certain layer header. For example, a first point can be the beginning of a frame, a beginning of a L2 Ethernet header, a start of a PPPoE header, a start of a IP header, a start of a RFC2684 header, and the like.

This general lookup key command can be used in addition to a more specific (for example Ethernet, ATM and the like) lookup key parse commands.

TABLE 5

| Length (bits) | Field name | Description |
|---|---|---|
| 8 | Opcode | 0x016, 0x017 |
| 4 | Start_point0 | Start point location of first extracted byte group.. |
| 5 | Key_size0 | Size of the first extracted byte group. |
| 7 | Base_offset0 | Beginning of the first extracted byte group-offset from the starting point. |
| 4 | Start_point1 | Start point location of second extracted byte group.. |
| 5 | Key_size1 | Size of the second extracted byte group. |
| 7 | Base_offset1 | Beginning of the second extracted byte group-offset from the starting point. |
| 4 | Start_pointJ | Start point location of Jth extracted byte group.. |
| 5 | Key_sizeJ | Size of the Jth extracted byte group. |
| 7 | Base_offsetJ | Beginning of the Jth extracted byte group-offset from the starting point. |

Table 6 illustrates the content of a lookup key mask command. This parse command slightly differs from the lookup key parse commands used for Ethernet, ATM. ATMAAL5, as the lookup key is generated by concatenating a lookup key portion that is programmed by the user and some bytes of the payload of the frame.

TABLE 6

| Length (bits) | Field name | Description |
|---|---|---|
| 8 | Opcode | 0x10 |
| 3 | Mask index | Mask a group of four selected bits |

TABLE 6-continued

| Length (bits) | Field name | Description |
|---|---|---|
| 32 | Mask default value | Bitwise value of mask that is applied to the lookup key before performing the lookup. |

Table 7-Table 9 illustrate various lookup mode parse commands. There are three lookup modes—indexed table lookup mode, CAM emulation table lookup mode and hash table lookup mode. In an indexed table lookup mode the lookup key is used as an index to a lookup table. The size of the lookup table is user programmable. In a CAM emulation table lookup mode the size of the lookup table should be small. The CAM emulation table lookup mode usually includes a comparison of an additional field not selected by the bitmap of the parsing command. In this mode a predefined sized lookup key is compared to multiple tags that are stored in the lookup table. If a match is found the corresponding interworking action descriptor is fetched. A hash table lookup mode includes hashing the lookup key and using the result as an index to the lookup table. This mode is usually used when the lookup table is large. This lookup table includes multiple tags that are compared to the result of the hashing. If the hash result does not match even one of the tags than a lookup miss is declared.

Table 7 illustrates an indexed table lookup mode parse command.

TABLE 7

| Length (bits) | Field name | Description |
|---|---|---|
| 8 | Opcode | 0x029 |
| 8 | PCDID value | Parse command identification number. |
| 1 | AGING | Update age of action descriptor |
| 1 | MIE | Missed lookup interrupt enable |
| 1 | EXT | Lookup table in internal or external memory |
| 32 | Lookup_Table_Base | Base address of lookup table |
| 32 | CompressKey | Compress key bitmap indicates which bits of the lookup key should be used when performing a lookup operation |

Table 8 illustrates a CAM emulation lookup mode parse command.

TABLE 8

| Length (bits) | Field name | Description |
|---|---|---|
| 8 | Opcode | 0x028 |
| 8 | PCDID value | Parse command identification number. |
| 8 | Lookup_Table_Size | Size of lookup table |
| 1 | AGING | Update age of action descriptor |
| 1 | MIE | Missed lookup interrupt enable |
| 2 | Lookup_Key_Size | Size of lookup key |
| 32 | Lookup_Table_Base | Base address of lookup table |

Table 9 illustrates an eight way hash lookup mode parse command.

TABLE 9

| Length (bits) | Field name | Description |
|---|---|---|
| 8 | Opcode | 0x023 |
| 8 | PCDID value | Parse command identification number. |
| 2 | Lookup_Key_Size | Size of lookup key |
| 1 | AGING | Update age of action descriptor |
| 1 | MIE | Missed lookup interrupt enable |
| 1 | EXT | Lookup table in internal or external memory |
| 4 | Hash_result_size | Size of hash result. This is responsive to the number of sets in the lookup table. |
| 32 | Lookup_Table_Base | Base address of lookup table |

TABLE 10 illustrates the content of the last parse command in a table.

TABLE 10

| Length (bits) | Field name | Description |
|---|---|---|
| 8 | Opcode | 0x3F |
| 8 | PCDID value | Parse command identification number. |
| 1 | DBM | Discard frame/receive frame in queue |
| 1 | CPU | Do not forward frame/forward frame to processor |
| 2 | LIE | Generate/do not generate an interrupt |
| 8 | Stat counter | Update value of statistical counter when last parse command is retrieved |

FIG. 6 illustrates method 300 for processing a frame. Method 300 starts by stage 310 of providing a parse command data structure that comprises multiple parse commands that are linked to each other.

For convenience of explanation the various stages of method 300 refer to exemplary data structured 410-490.

Stage 310 is followed by stage 320 of receiving a frame.

Stage 320 is followed by stage 330 of selecting a parse command out of multiple lookup key parse commands. Conveniently, the selection is responsive to the type (or sub-type) of the received frame. Conveniently the first parse command out of a parse command data structure is selected.

Stage 330 is followed by stage 340 of retrieving a lookup key parse command that includes an instruction field and an bitmap representative of selected frame fields to be searched in the frame.

Stage 340 is followed by stage 350 of verifying a type of the received frame. Conveniently, stage 350 includes executing at least one set of predefined frame type verification instructions associated with the lookup key parse command.

According to an embodiment of the invention this stage includes extracting multiple frame fields and storing them and optionally their offset from the beginning of the frame.

Stage 350 is followed by stage 360 of storing match results indicating an existence of a group of frame fields in the received frame, wherein the group of frame fields comprises the selected frame fields as well as non-selected frame fields.

Stage 360 is followed by stage 365 of fetching another lookup key parse command, if the type of the received frame did not match an expected frame type. It is noted that the other parse command can belong to another parse command data structure, and can belong to the missed frame parse command table 430.

According to an embodiment of the invention the execution of this additional parse command can include using the previously stored extracted frame fields as well as their offset from the beginning of the frame.

Stage 360 is followed by stage 370 of generating a lookup key by extracting at least one frame field if the type of the received frame matches an expected frame type. This can include concatenating the extracted fields.

Stage 370 is followed by stage 375 of fetching a lookup key mask command that comprises lookup key masking information.

Stage 375 is followed by stage 380 of retrieving a lookup type parse command descriptor that includes a lookup type information.

Stage 380 is followed by stage 385 of looking up, using the lookup key, for additional frame processing instructions. Conveniently, stage 385 of looking up is responsive to the lookup type information.

If the lookup fails the additional frame processing instructions can include an instruction to jump to another parse instruction of table 410. It is noted that multiple iterations of stages 320-375 can be executed. The iterations usually ends when the lookup succeeds or when a last parse command was reached and a termination operation is executed.

Conveniently, stage 385 includes stage 386 of masking the lookup key to provide a masked lookup key.

Stage 385 is followed by stage 390 of executing at least one additional frame processing instruction. This instruction can be included, for example, within data structures 490 or 470.

Conveniently, stage 390 includes stage 395 of retrieving an additional lookup key parse command.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for processing a frame, the method comprising:
   receiving a frame;
   retrieving a lookup key parse command that comprises an instruction field and a bitmap representative of selected frame fields to be searched in the frame;
   generating a lookup key by extracting at least one frame field if the type of the received frame matches an expected frame type; and
   looking up, using the lookup key, for additional frame processing instructions.

2. The method according to claim 1 further comprising fetching another lookup key parse command, if the type of the received frame did not match an expected frame type.

3. The method according to claim 1 wherein the looking up is preceded by retrieving a lookup type parse command that comprises a lookup type information; and wherein the looking up is responsive to the lookup type information.

4. The method according to claim 1 further comprising executing at least one additional frame processing instruction wherein the executing comprises retrieving an additional lookup key parse command.

5. The method according to claim 1 wherein the looking up comprises masking the lookup key to provide a masked lookup key.

6. The method according to claim 1 further comprising storing match results indicating an existence of a group of frame fields in the received frame, wherein the group of frame fields comprises the selected frame fields as well as non-selected frame fields.

7. The method according to claim 6 wherein the storing comprises storing fields offset information representative of an offset between various frame fields and a start address of the frame.

8. The method according to claim 1 further comprising
providing a parse command data structure that comprises multiple parse commands that are linked to each other; and
selecting a lookup key parse command out of multiple lookup key parse commands stored in a parse command data structure.

9. The method according to claim 1 further comprising verifying a type of the received frame.

10. The method according to claim 9 wherein the verifying comprises executing at least one set of predefined frame type verification instructions associated with the lookup key parse command.

11. A device for processing a frame, the device comprising:
a receive interface adapted to receive a frame;
a processor adapted to retrieve a lookup key parse command that comprises an instruction field and a bitmap representative of selected frame fields to be searched in the frame, generate a lookup key by extracting at least one frame field if the type of the received frame matches an expected frame type and perform a look up, using the lookup key, for additional frame processing instructions.

12. The device according to claim 11 wherein the processor is adapted to fetch another lookup key parse command, if the type of the received frame did not match an expected frame type.

13. The device according to claim 11 wherein the processor is adapted to retrieve a lookup type parse command that comprises a lookup type information, and wherein the looking up is responsive to the lookup type information.

14. The device according to claim 11 wherein the processor is adapted to execute at least one additional frame processing instruction wherein the execution comprises a retrieval of an additional lookup key parse command.

15. The device according to claim 11 wherein the processor is adapted to retrieve a lookup key mask command that comprises lookup key masking information, and to mask the lookup key to provide a masked lookup key.

16. The device according to claim 11 further comprising a memory unit adapted to store match results indicating an existence of a group of frame fields in the received frame, wherein the group of frame fields comprises the selected frame fields as well as non-selected frame fields.

17. The device according to claim 16 wherein the device is further adapted to store fields offset information representative of an offset between various frame fields and a start address of the frame.

18. The device according to claim 11 further comprising a memory unit that is adapted to store a parse command data structure that comprises multiple parse commands that are linked to each other; wherein the processor is adapted to select a lookup key parse command out of multiple lookup key parse commands stored in a parse command data structure.

19. The device according to claim 11 wherein the processor is adapted to verify a type of the received frame.

20. The device according to claim 19 wherein the processor is adapted to execute at least one set of predefined frame type verification instructions associated with the lookup key parse command.

* * * * *